United States Patent Office
3,523,924
Patented Aug. 11, 1970

3,523,924
CARBON DIOXIDE POLYMERS
Robert D. Lundberg, St. Albans, and Donald R. Montgomery, Charleston, W. Va., assignors to Union Carbide Corporation, a corporation of New York
No Drawing. Filed Feb. 20, 1967, Ser. No. 617,083
Int. Cl. C08g 22/04
U.S. Cl. 260—77.5
11 Claims

ABSTRACT OF THE DISCLOSURE

Substituted aziridines are reacted with carbon dioxide to produce a copolymer containing repeating urethane and imine groups. Unsubstituted aziridines do not form copolymers. The reaction may be optionally catalyzed by a Lewis acid, Lewis base or Grignard reagent. The polymers are useful as waterproof coatings for paper.

---

This invention relates to nitrogen containing polymers. More particularly, this invention relates to aziridine polymers, specifically copolymers of polyurethanes and aziridines.

It has been known prior to the present invention that synthetic materials, both resinous and non-resinous could be produced by reacting aziridines with various other materials. For example, U.S. Pat. 2,257,162 describes the production of synthetic resins, which are said to be stable against acids and alkalis. These resins are produced by the reaction between monomeric or polymeric aziridines, sometimes referred to as 1,2-alkyleneimines and an aromatic isocyanate or isothiocyanate. U.S. Pat. 2,596,200 also teaches the reaction of aziridines but in this instance $\alpha,\beta$-olefinic carboxylic acid esters of polyhydric alcohols are used as co-reactants.

It has now been discovered that certain aziridines and organo substituted aziridines can be reacted in the presence of or with carbon dioxide to produce linear polymers, including copolymers containing recurring urethane and imine groups. According to one aspect of the invention, carbon dioxide can be readily reacted with aziridines to produce copolymers having the general formula:

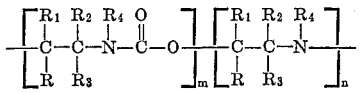

wherein R, $R_1$, $R_2$, and $R_3$, which can be the same (with the exception $R=R_1=R_2=R_3=R_4 \neq H$) or different, are monovalent radicals selected from the group consisting of hydrogen, aryl, alkyl, alkene, alkaryl, haloalkyl such as chloroalkyl, haloaryl such as chloroaryl, haloalkaryl such as chloroalkaryl and haloalkene such as chloroalkene and substituted alkyls whose substituents do not react with the other components present under a polymerization conditions, $R_4$=H, alkyl, aryl, or substituted alkyl e.g., hydroxyl alkyl with $m$ an integer having a value of from 1 to about 5, preferably from 1 to about 3 within any single recurring unit while the total of all $m$'s in a polymer molecule has a value from about 3 to about 200, preferably from about 5 to about 40, $n$ is an integer having a value of from 1 to about 50, preferably from 1 to about 5 within any single recurring unit while the total of all $n$'s in a polymer molecule has a value from about 3 to about 200, preferably from about 5 to about 40, and the sum of all $m$'s and all $n$'s is from about 6 to about 400, preferably from about 8 to about 80. Generally, R, $R_1$, $R_2$, and $R_3$ are any alkyl, aryl, alkaryl, alkene radicals containing from about 1 to about 10 carbon atoms, preferably from about 1 to about 4 carbon atom alkene or alkyl radicals, hydrogen, from about 6 to about 10 carbon atom aryl radicals and from about 7 to about 10 carbon atom alkaryl radicals and similar for the alkyl and aryl groups for $R_4$.

The reaction products of this invention find particular utility as paper additives, in fabric treatment and as dispersing agents.

Although the inventors do not wish to be limited to any theory in one aspect of the invention, the reaction between carbon dioxide and the aziridines is believed to form imineurethane copolymers as illustrated by the following equation wherein 2-methylaziridine (sometimes referred to as propyleneimine) is taken as illustrative of a suitable alkyleneimine:

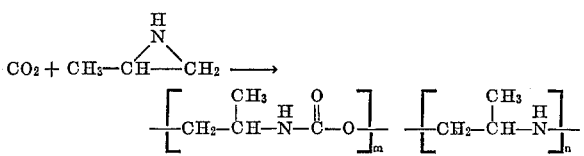

wherein $m$ and $n$ are as previously defined.

Suitable aziridines for purposes of this invention are those having the general formula:

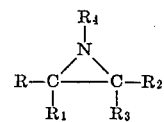

wherein R, $R_1$, $R_2$, $R_3$ and $R_4$, are previously defined.

These aziridines (by which it is also intended to include N-hydroxyalkyl aziridines) include the alkyl aziridines, aryl aziridines, alkaryl aziridines, alkylaryl aziridines, alkylalkaryl aziridines, and the 2,2-configurations thereof. Illustrative of aziridines suitable for use in the present invention are 2-methyl aziridine (propyleneimine), 2,2-dimethyl aziridine (2,2-dimethylethylene imine), and N-hydroxyethyl aziridine.

Other suitable aziridines include the following:

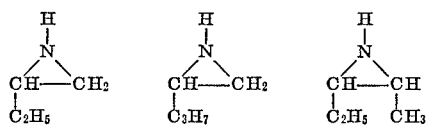

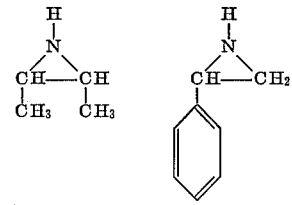

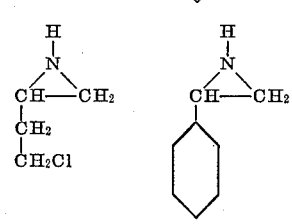

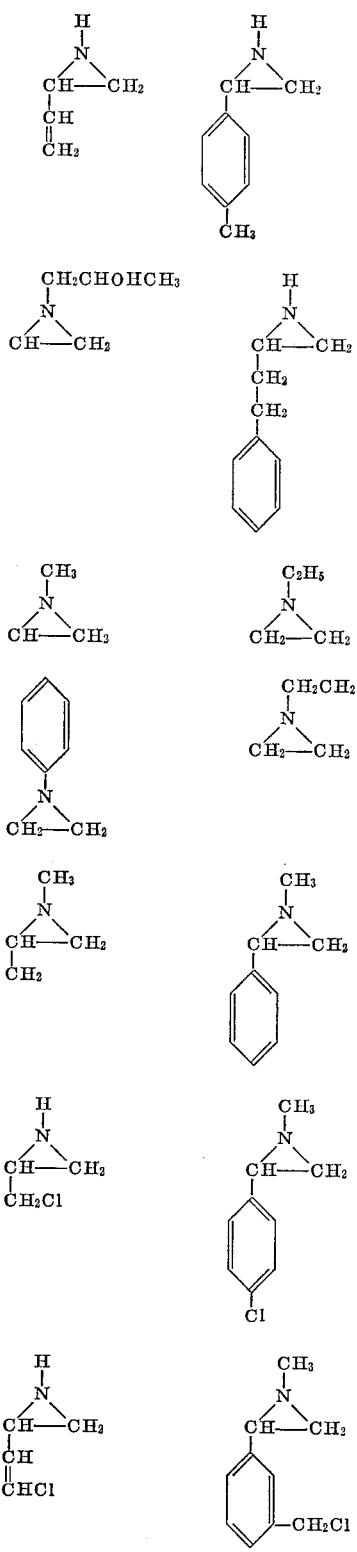

The copolymers embodied herein may be prepared by contacting suitable amounts of carbon dioxide and aziridine until the copolymer is formed. In one manner of carrying out the invention, the desired quantity of aziridine is solvated with a suitable solvent in a closed reaction system, the system is pressurized with carbon dioxide and the reactants are reacted for a period of time sufficient to produce a copolymer containing the desired amount of reacted carbon dioxide.

Aziridine (ethyleneimine) according to available evidence does not form a copolymer but, a homopolymer containing labile carbon dioxide. Thus the case of R, $R_1$, $R_2$, $R_3$, $R_4$=H is not a part of the invention since only homopolymers of aziridine are obtained.

Preferably the reaction is conducted by pressurizing a suitable reaction vessel containing the aziridine with an atmosphere of carbon dioxide. Copolymers containing up to and in excess of about 30 percent by weight copolymerized carbon dioxide can be produced in this manner employing carbon dioxide on the order of from about 20 p.s.i.g., to an excess of about 4000 p.s.i.g. Preferably the reaction to produce the copolymers of this invention is conducted by contacting the aziridine with carbon dioxide under a pressure of from about 200 to about 1000 p.s.i.g If desired, the reaction can be conducted under an atmosphere containing a major portion of an inert gas such as nitrogen, He, Ne, Ar, Kr, Xe, Rn or any other gas that is empirically observed to be non-reactive in the system.

The temperatures at which the polymerization reaction is conducted can also be varied considerably depending, for instance, upon the particular aziridine employed, the rapidity of the reaction desired, and the presence or absence of a catalyst and/or solvent. For example, the reaction temperature can be varied from about 0° C. to a temperature below that of the decomposition temperature of the product. Generally the temperature at which the reaction is conducted ranges from about 25° C. to about 150° C. and preferably from about 50° C. to about 100° C.

Generally, any solvent can be used that remains substantially liquid at the pressure and temperature conditions for the polymerization reaction and which will not react or complex with the carbon dioxide and aziridine under the conditions of polymerization.

Additionally, the reaction can be effected in the absence of a solvent for the aziridine. Suitable solvents for the purpose of this invention are, inter alia, aliphatic hydrocarbons such as pentane, hexane, heptane, decane, octane and the like; aromatic hydrocarbons such as benzene, xylene, toluene, and the like; aliphatic ketones such as acetone, methyl isobutyl ketone, diethyl ketone, methyl ethyl ketone and the like; chlorinated hydrocarbons such as chloroform, methylene chloride, ethylene dichloride, and the like; diethyl ether and similar ethers; dimethyl formamide and other similar systems. If desired, water can also be employed effectively as a solvent.

The solvent, when employed, is generally present in an amount of from about 0.5 to about 10 times that of the weight of the aziridine reactant present, and preferably in an amount of from 1 to 3 times that of the weight of the aziridine reactant present. At the end of the reaction period, the inert solvent and any unreacted aziridine are then removed by any suitable means, as for example, by precipitation in diethyl ether followed by washing with ether and drying the precipitate under vacuum. In some instances, precipitation with a solvent is not required as the polymer is formed as a solid suspended in the reaction media comprising the inert solvent. In such a case, all that is required is washing the polymer with additional inert solvent. This generally is the case when isooctane is used as the inert solvent.

The polymerization proceeds readily under the conditions set forth previously. However, where desired, acceleration of the polymerization reaction can be realized by the use of catalytic amounts of Lewis acid catalysts such as Friedel-Crafts catalyst, for example, aluminum trichloride, boron trifluoride, ferric chloride, stannic chloride, zinc chloride, $Al_2Cl_6$, $AlCl_3$, NaCl, $ZrCl_4$, $TaCl_5$, $CbCl_5$, $BeCl_2$, $TiCl_4$, $SbCl_5$, $TeCl_2$, $TeCl_4$, $BiCl_3$, $AlBr_3$, as well as sulfuric acid, phosphorus pentoxide, phosphoric acid, and the like.

Grignard reagents may also be employed as polymerization catalysts and generally comprise compounds of the structure:

$$RmgX$$

where X is a halogen and R is an organo group. Typical compounds include the following:

| Type | Example | Formula |
| --- | --- | --- |
| Allylic | Allylmagnesium chloride | $CH_2CHCH_2MgCl$ |
| Acetylenic | 1-propynylmagnesium bromide | $CH_3C{:}CMgBr$ |
| Aromatic | Phenylmagnesium bromide | $C_6H_5MgBr$ |
| Araliphatic | Benzylmagnesium bromide | $C_6H_5CH_2MgBr$ |
| Heterocyclic | 2-thienylmagnesium bromide | $\overline{S.CH{:}CH.CH{:}CMgBr}$ |
| Heterocyclic nitrogen | 2-pyrrylmagnesium bromide | $\overline{C(MgBr){:}CH.CH{:}CH.NH}$ |

Lewis bases well known in the art may also be employed as polymerization catalysts in the reaction. Catalysts of this type may be classified as either negative or positive catalysts for the purpose of the present invention, in that they either slow down or accelerate the reaction rate and/or additionally decrease or increase the yield of polymer. It has been generally observed that anionic catalysts or Lewis bases act as negative catalysts, one exception being calcium amide which is normally an anionic catalyst that accelerated the reaction rate and also promoted increased yields. Generally, when used, the catalyst is employed in an amount 0.02 to 10 weight percent, preferably in an amount 1 to 3 weight percent based on the aziridine.

Depending on conditions such as temperature, pressure, and the presence or absence of solvent and/or catalyst, the reaction time required to effect the formation of a copolymer of this invention containing the desired amount of combined carbon dioxide can vary from a few minutes to several hours. Generally, employing a $CO_2$ pressure in excess of 200 p.s.i.g. and a temperature in excess of about 50° C., copolymers containing up to and in excess of 30 percent by weight combined carbon dioxide are produced in about 1 to 10 hours. For example, a copolymer of urethaneimine recurring units was produced by reacting 2-methyl aziridine and carbon dioxide at 50° C. and 500 p.s.i.g. for a period of 6 hours.

Recovery of the copolymer product can be accomplished, as previously stated, by any convenient method such as precipitation or removing unreacted components under vacuum, and the like.

The following examples are given by way of illustration and not by way of limitation.

EXAMPLE I

A charge of 25 ml. benzene and 15 grams of 2-methyl aziridine is sealed in a glass-lined 500 ml. Parr autoclave. Carbon dioxide is introduced into the autoclave to provide a pressure of 500 p.s.i.g. on the system. The reaction system is then heated at 50° C. for a period of 18 hours, cooled and the reaction solution decanted into a volume of about 75 ml. ether. After filtering and drying the precipitated product, 20.2 grams of white powder is obtained. The product analyzed: C, 51.93; H, 9.25; N, 16.39; O, 22.43 and had a reduced viscosity of 0.07 (1% solution in water).

The polymer is subjected to infrared analysis and to labile (complexed) carbon dioxide determination in order to verify the polymer as one containing urethane and imine units. Labile carbon dioxide analysis indicated that most of the combined carbon dioxide is present as urethane moieties. Generally speaking, the analyses indicated 5 percent labile $CO_2$ out of 25–35 percent "total $CO_2$," or stated otherwise, about 15 to about 20 percent of the total $CO_2$ was "labile." Confirmation is obtained by infrared analysis which shows a C=O band at 5.87 and an N—H band at 6.5 and no band at 6.2–6.3, the range for $CO_2$·secondary amine complexes. Similar results are obtained for the examples hereinafter set forth for substituted aziridines.

Determination of the labile carbon dioxide is made in the following manner:

To a dilute solution of copolymer in 15 ml. of water was added 1 ml. of 50% sulfuric acid. The liberated carbon dioxide was carried via nitrogen stream through a gas sparger into a cell containing 10 ml. of a 0.1 M $Ba(OH)_2$ solution (containing 1% butanol). The precipitated barium carbonate was filtered, and a 5-ml. aliquot of the filtrate was withdrawn and the excess $Ba(OH)_2$ titrated with standard hydrochloric acid.

EXAMPLE II

The procedure of Example I is repeated with the exceptions that 100 ml. isooctane is employed as the solvent and 0.5 g. phenylmagnesium bromide added as catalyst, and the reaction conducted for 24 hours at 35° C. and 300 p.s.i.g. carbon dioxide. The polymer is not precipitated in ether as is done in Example I but further washed with isooctane. The isolated polymeric product analyses is as follows: C, 54.21; H, 9.22; N, 17.88 and has a reduced viscosity of 0.036 (1% solution in water).

EXAMPLE III

The procedure of Example I is followed with the exception that the reaction is conducted for 16 hours at 50° C. and 300 p.s.i.g. carbon dioxide. Twenty-one grams of polymeric product is isolated analyzing: C, 55.67; H, 9.30; N, 16.60 with a reduced viscosity of 0.14 (1% solution in water).

EXAMPLE IV

The procedure of Example I is followed with the exception that 0.25 ml. of concentrated sulfuric acid is employed as a catalyst at a reaction time of 3 hours. The isolated polymeric product analyses: C, 50.67; H, 9.89; N, 17.30 and has a reduced viscosity of 0.051 (1% solution in water).

EXAMPLE V

The procedure of Example IV is followed with the exception that 25 ml. acetone is employed as a solvent. The polymeric product, 18.6 grams of tan powder, analyzes: C, 54.52; H, 9.90; N, 16.61 and has a reduced viscosity of 0.054 (1% solution in water).

EXAMPLE VI

The procedure of Example IV is followed with the exception that 0.6 gram of calcium amide is employed as a catalyst. The polymeric product analyzes: C, 50.2; H, 8.34; N, 15.92 with a reduced viscosity of 0.041 (1% solution in water).

EXAMPLE VII

Benzene (15 ml.) and 2,2-dimethyl aziridine (10 ml.) are charged to a 500 ml. glass-lined Parr autoclave together with 2 drops of concentrated sulfuric acid. The system is sealed and carbon dioxide introduced in a pressure of 500 p.s.i.g. After 4 hours at 75° C., the autoclave is vented. Addition of n-butyl ether to the reaction mixture precipitates a small amount of solid which is filtered. The filtrate is then evaporated down, the residual viscous liquid washed with ethyl ether and dried under vacuum. Four grams of viscous liquid are thus collected. The reduced viscosity determined as a 1% solution in dimethylformamide is 0.110. The product analyzes as: C, 64.06; H, 11.64; N, 16.06.

EXAMPLE VIII

Benzene (100 ml.) and N-hydroxyethyl aziridine (100 gr.) are charged to a 500-ml. glass-lined Parr autoclave, and the autoclave sealed. Carbon dioxide is added to provide a pressure of 700 p.s.i.g. After stirring for about 10 minutes at 26° C., an exothermic reaction occurs raising the temperature to 94° C. and the pressure to 800 p.s.i.g. Thirty-five minutes later the temperature drops to 41° C.; the pressure is vented and the autoclave opened. The reaction mixture is added to water and filtered. The water is evaporated from the filtrate leaving a brown viscous liquid. The reduced viscosity of the product determined in a 1% aqueous solution is 0.034. An infrared scan shows a strong absorption at 5.8 indicative of carbon dioxide incorporation into a copolymer structure.

It is to be understood that this invention is not limited to the specific reactants given by way of illustration in the foregoing examples. Thus, instead of employing a single species of the specified aziridines as a reactant, a plurality of such aziridines in any proportions can be employed.

The polymer of Example I in a 2% benzene solution when applied as a coating to paper and air-dried resulted in the production of a water resistant paper.

What is claimed is:

1. A copolymer containing at least two classes of interconnected polymeric radicals of the following structure:

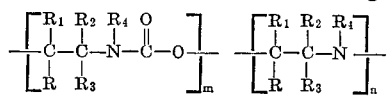

in which R, $R_1$, $R_2$ and $R_3$ may be the same or different and are monovalent radicals selected from the group consisting of hydrogen, aryl, alkyl, alkene, haloalkyl, haloaryl, haloalkene, haloalkaryl, $R_4$ is a radical selected from the group consisting of alkyl, hydroxyalkyl, hydrogen and aryl, said radicals R, $R_1$, $R_2$, $R_3$ and $R_4$ contain from about 1 to about 10 carbon atoms and where all but one of the radicals R, $R_1$, $R_2$, $R_3$ and $R_4$ may be hydrogen, wherein $m$ is an integer having a value of from about 1 to about 200 and $n$ is an integer having a value of from about 1 to about 200 the sum of $m$ and $n$ being from about 6 to about 400.

2. The polymer of claim 1 comprising a copolymer containing at least two classes of interconnected polymeric radicals of the following structure:

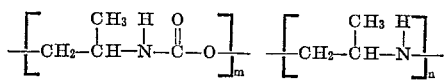

wherein $m$ is an integer having a value of from about 1 to about 5, $n$ is an integer having a value of from about 1 to about 50, the total number of $m$'s being from about 3 to about 200 and the total number of $n$'s being from about 3 to about 200.

3. A method for the production of a polymer comprising reacting carbon dioxide and aziridine of the formula:

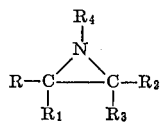

in which R, $R_1$, $R_2$, and $R_3$ may be the same or different and are monovalent radicals selected from the group consisting of hydrogen, aryl, alkyl, alkene, alkaryl, haloalkyl, haloaryl, haloalkene, haloalkary, $R_4$ a radical selected from the group consisting of alkyl, hydroxyalkyl, hydrogen and aryl, said radicals R, $R_1$, $R_2$, $R_3$ and $R_4$ contain from about 1 to about 10 carbon atoms and where all but one of the radicals R, $R_1$, $R_2$, $R_3$, and $R_4$ may be hydrogen.

4. The method of claim 3 where said polymer is formed in the presence of a catalytic amount of at least one member selected from the group consisting of Lewis acids, and Lewis bases and Grignard reagents at a temperature from 0° C. to about 150° C. and a pressure of from about 20 to 4,000 p.s.i.g carbon dioxide, said aziridine and said carbon dioxide being in a mole ratio of from about 10.1 to about 1.50.

5. The method of claim 3 where said Lewis acid is selected from a member of the group consisting of mineral acids and Friedel-Crafts polymerization catalysts.

6. The method of claim 4 where said Lewis base comprises an alkaline earth metal amide.

7. The method of claim 4 where said Lewis base comprises an alkali metal amide.

8. A method as defined in claim 4 wherein the catalyst is sulfuric acid.

9. A method as defined in claim 4 wherein the catalyst is calcium amide.

10. A method as defined in claim 4 wherein the catalyst is phenyl magnesium bromide.

11. The method of claim 3 wherein the polymerization reaction is conducted at a pressure of from about 20 to about 4,000 p.s.i.g. carbon dioxide and a temperature of from about 0° C. to about 150° C.

References Cited

UNITED STATES PATENTS 2,824,857  2/1958  Drechsel _____ 260—77.5
3,423,345  1/1969  Hsu et al. _____ 260—18

DONALD E. CZAJA, Primary Examiner

M. J. WELSH, Assistant Examiner

U.S. Cl. X.R.

117—155